Jan. 25, 1944. V. L. MINET 2,340,200
SCREEN DISPLAY
Filed June 8, 1942 4 Sheets-Sheet 1

V. L. Minet
INVENTOR.
BY

Jan. 25, 1944.   V. L. MINET   2,340,200
SCREEN DISPLAY
Filed June 8, 1942   4 Sheets-Sheet 3

V. L. Minet
INVENTOR.
BY C. A. Snow & Co.

Jan. 25, 1944.   V. L. MINET   2,340,200
SCREEN DISPLAY
Filed June 8, 1942   4 Sheets-Sheet 4

- WHITE LIGHT
- BLACK OUT
- BLUE LIGHT
- DOOR OPEN
- WHITE LIGHT
- BLACK OUT
- PURPLE LIGHT
- DOOR OPEN
- WHITE LIGHT

V. L. Minet
INVENTOR.
BY

Patented Jan. 25, 1944

2,340,200

UNITED STATES PATENT OFFICE 2,340,200

SCREEN DISPLAY

Valere Laurence Minet, Geneva, N. Y., assignor of one-fourth to Russell R. Isenhour, Geneva, N. Y.

Application June 8, 1942, Serial No. 446,227

6 Claims. (Cl. 40—28)

The device forming the subject matter of this application is a panel, carrying display members, the display members being capable of being hidden by movable doors, novel means being provided for opening the doors, one after another, and novel means being provided for illuminating the panel in a predetermined sequence of colors, with intervening blackouts.

The invention aims to provide novel means for actuating and controlling the doors and the illuminating means in timed relation.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
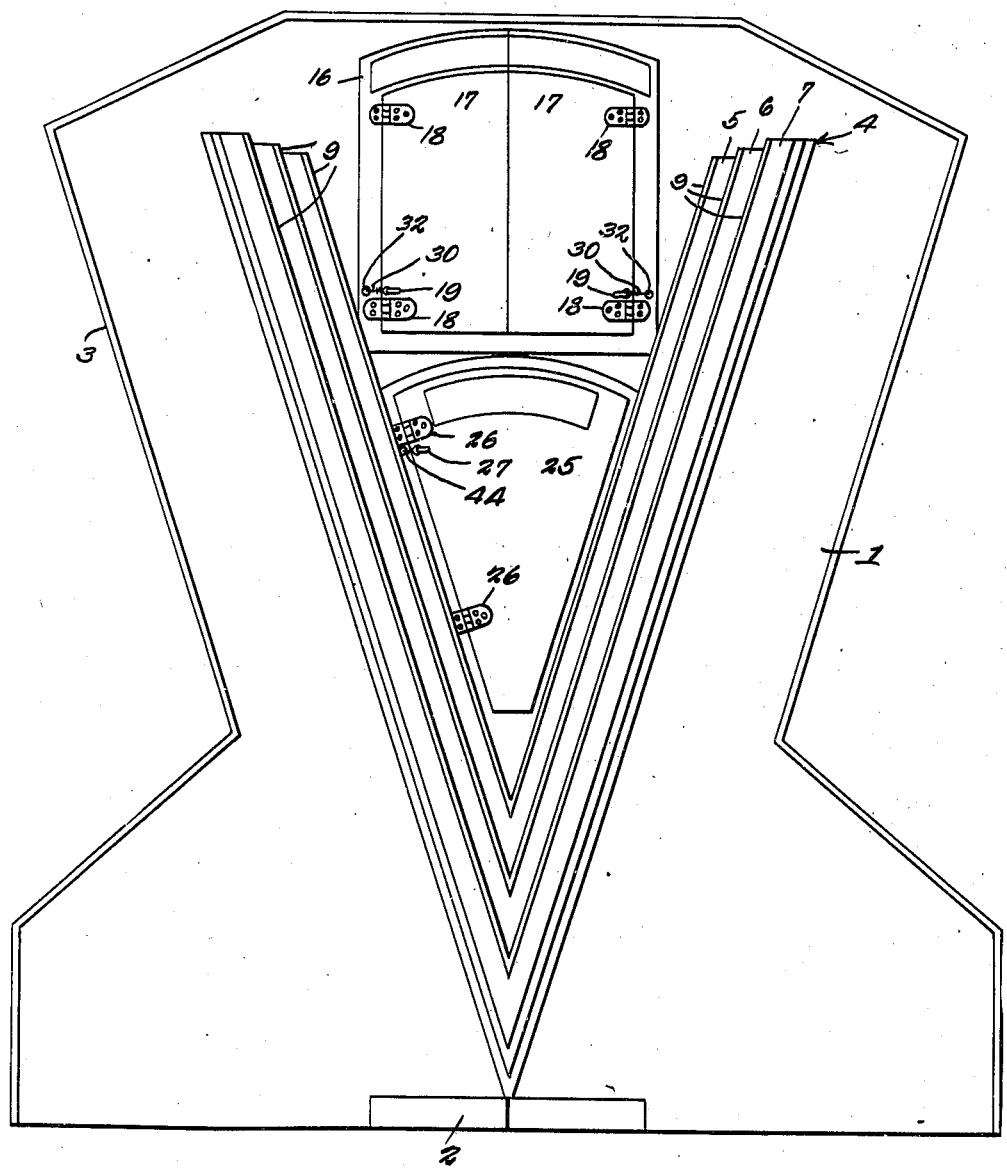
Fig. 1 shows in front elevation, a display panel constructed in accordance with the invention.

In carrying out the invention, there is provided a vertical panel 1, of any desired outline. The panel 1 is provided with a supporting foot 2, and has a marginal trimming strip 3, constructed as desired.

The face of the panel 1 carries a symbol 4, preferably the letter V. The symbol 4 comprises a rear member 5, an intermediate member 6, and a front member 7. The rear member 5 is secured to the panel 1, in contact therewith, the rear member being connected to the intermediate member 6, and the intermediate member being connected to the front member 7, by spacers 8.

Figure 3:
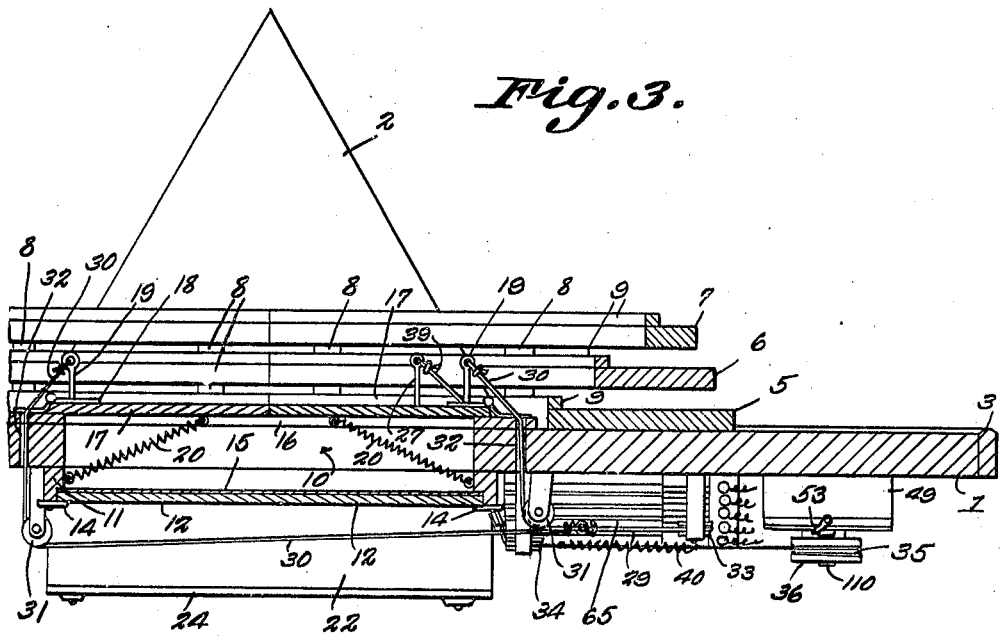
Fig. 3 is a transverse section on the line 3—3 of Fig. 2.

The rear member 5 is wider than the intermediate member 6, and the intermediate member is wider than the front member 7. On their forward surfaces, and at their inner edges, the members 5, 6 and 7 of the symbol 4 are supplied with forwardly projecting ribs 9. Noting Fig. 3, neither the ribs 9 nor the outer edges of the parts 7, 6 and 5, are in alinement, that is, in planes at right angles to the panel 1. Therefore, each of the parts 7, 6 and 5 presents a complete outline to the observer. The parts 5, 6 and 7 may be of any desired colors, and color arrangement is not a patentable feature in a device of the class described. If desired, the part 7 may be red, the part 6 white, and the part 5 blue, to present the national colors. The strips 9 preferably are luminous.

The panel 1 is supplied with a doorway 10, preferably located near the upper edge of the panel. Secured to the rear surface of the panel 1, and disposed about the doorway 10, is a frame 11, on which a closure 12 is held, by a pivotally mounted button 14, or otherwise. On its forward surface, the closure 12 carries a display 15. It will be understood that the showing of the display 15 in the drawings is illustrative only: the display may be of any desired sort.

A bounding frame 16 is secured to the forward surface of the panel 1, about the doorway 10. The doorway 10 is closed, and the display 15 may be hidden, by doors 17, the doors being connected to the frame 16 by hinges 18, for horizontal swinging movement, to and from closed position. The leaves of the hinges 18 which are connected to the doors 17 are supplied with forwardly projecting arms 19. The doors 17 are closed by any suitable means, for example, retractile springs connected to the doors and to the frame 11, the springs being designated by the numeral 20.

The casing 21 is mounted on the rear surface of the panel 1 and opens forwardly through the panel. The casing 21 is of blunted wedge shape, and is surmounted by a cap 22, which may be regarded as part of the casing. The casing 21 has an opening 23 in its top. The casing 21 carries a display 24, which may be of any desired sort. The forward portion of the casing 21 is closed by a door 25, hingedly mounted at 26, to swing horizontally. The door 25 has a forwardly projecting arm 27, the door being closed by a retractile spring 28, connected to the door and to the casing 21.

Figure 2:
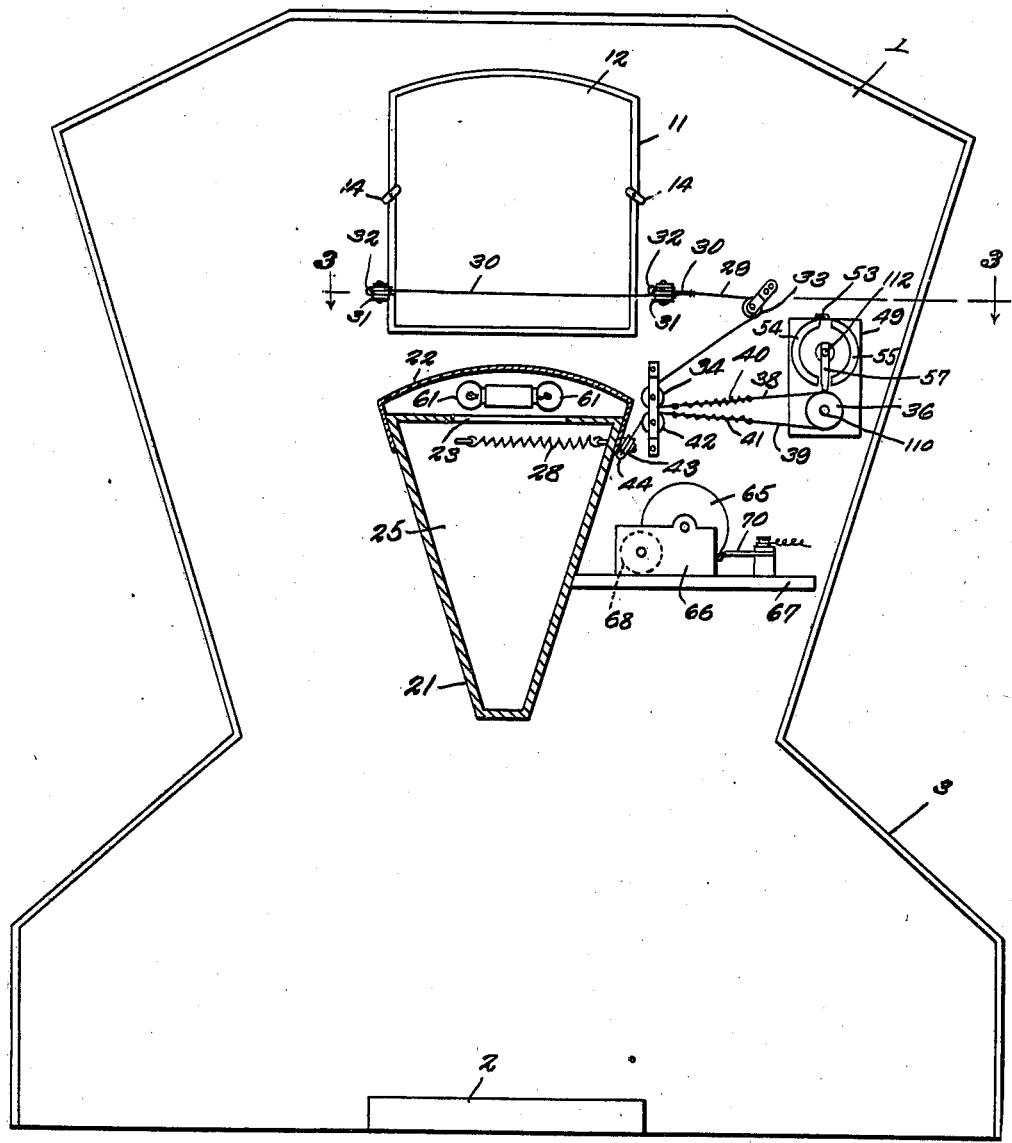
Fig. 2 is a rear elevation wherein parts are sectioned away.

The numeral 29 marks a flexible element, best shown in Fig. 2. The flexible element 29 has branches 30, which pass over sheaves 31, supported on the panel 1, and disposed at opposite sides of the doorway 18. The branches 30 of the flexible element 29 pass through holes 32 in the panel 1 and attendant parts, the branches being connected to the arms 19 on the doors 17.

Referring to Fig. 2, the flexible element 29 extends laterally, away from the doors 17, around a direction changing idler 33, supported for rotation upon the panel 1. From the idler 33, the flexible element 39 extends downwardly and inwardly around a sheave 34, supported for rotation on the panel 1. The intermediate portion of the flexible element 29 is given a turn or two, as indicated at 35, about a grooved pulley 36, the mounting and operation of which will be dealt with hereinafter. One of the turns 35 of the flexible element 29 is secured at 37 to the pulley 36.

Since the flexible element 29 is secured to the pulley 36, as aforesaid, the flexible element may be said to comprise a first run 38, constituting means for opening the doors 17, and a second run 39, constituting means for opening the door 25. The ends of a retractile spring 40 are secured to the run 38, and the ends of a retractile spring 41 are secured to the run 39. The run 39 extends inwardly and downwardly, over a sheave 42, mounted for rotation on the panel 1, and from the sheave 42, the run 39 extends downwardly and forwardly, over a sheave 43, supported by the panel 1, the said run passing through a hole 44 in the panel, the end of the run 39 being secured to the arm 27 on the door 25.

The numeral 49 marks a casing for a reversing electrical motor 50, the casing being mounted on the panel 1. The pulley 36 is secured to a shaft 110, journaled in the casing 49, and is connected by any suitable gearing 111 to a shaft 112, journaled in the casing. The shaft of the motor 50 is connected to either of the shafts 110 or 112 by a speed reduction gearing, not shown, since it is the common expedient of a mechanic. The motor 50 includes a reversing switch 52. The reversing switch 52 is operated in any suitable way, for example, by an arm 53, disposed at the upper end of the casing 49. The casing 49 carries two approximately semi-circular conducting tracks 54 and 55, insulated at 56 from the casing. There is an upper space 57 between the ends of the tracks 54 and 55, and a lower space 58 exists between the corresponding ends of the track. The shaft 112 operates a radial finger 59, carrying a contact 60, adapted to move over the tracks 54 and 55, the finger being adapted to actuate the switch arm 53.

Figure 7:
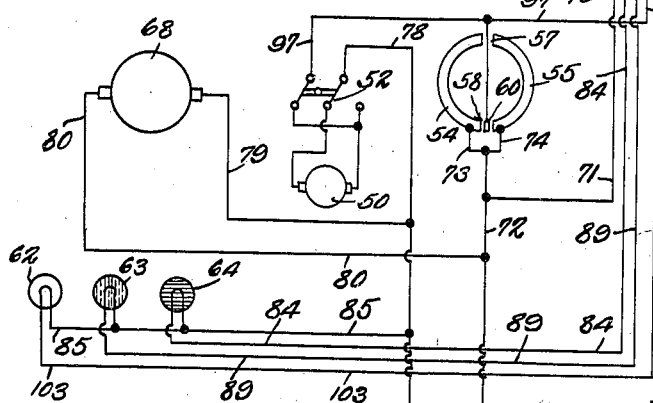
Fig. 7 is a circuit diagram.

Referring to Fig. 2, electric lamps 61 are located in the cap 22 of the casing 21, and are adapted to illuminate the display 24. The lamps 61 are not shown in Fig. 7, because current can be furnished to them in any appropriate way, and as the builder may desire. Referring to Fig. 7, at any appropriate distance from the panel 1 are located differently colored flood lamps 62, 63 and 64, adapted to play upon the panel 1. The lamp 62 may be a white lamp, the lamp 63 a purple lamp, and the lamp 64 a blue lamp.

A drum 65 is journaled to rotate on a casing 66 (Fig. 2) secured to the panel 1, the casing preferably being supported on a shelf 67, attached to the panel. The casing 66 encloses an electrical motor 68 (Fig. 8), the motor being geared to the drum 65 by any proper means, the drum rotating at a slow speed: the drum may make one rotation in ten minutes and forty seconds, for example.

At one end, the drum 65 is supplied with a circumferential conducting band 69, adapted to be engaged by a brush 70. The brush 70 is connected by a conductor 71 to a conductor 72, having a branch 73 connected to the track 54, and a branch 74 connected to the track 55. The conductor 72 is joined to a switch 75, adapted to close on mains 76 and 77.

The main 77 is connected by the switch 73 to a conductor 78, connected to the reversing switch 52. A conductor 79 joins the conductor 78 to one side of the motor 68, which operates the drum 65. The opposite side of the motor 68 is joined by a conductor 80 to the conductor 72.

On the drum 65 is mounted a conducting strip 81, connected electrically, as at 82, to the band 69. The strip 81 is adapted to be engaged by a brush 83, connected by a conductor 84 to one side of the blue lamp 64. The opposite side of the lamp 64 is connected to a conductor 85, joined to the conductor 78.

A conducting strip 86 is secured to the drum 65, out of line with the strip 81, the strip 86 being connected to the strip 81 by a conductor 87. The strip 86 is adapted to be engaged by a brush 88, connected by a conductor 89 to one side of the purple lamp 63, the opposite side of the lamp being joined to the conductor 85.

There are circumferentially spaced contact points 90, 91, 92 and 93 on the drum 65.

The contact points 90, 91, 92 and 93 are joined electrically, as shown at 94, and the contact point 92 is electrically connected, as at 95, to the strip 86.

The contact points 90, 91, 92 and 93 are adapted to be engaged, successively, by a brush 96. The brush 96 is connected by a conductor 97 to the reversing switch 52. The contact 60 has electrical connection with the conductor 97.

Conducting strips 98 and 99 are secured to the drum 65, in circumferentially spaced relation, the strips 98 and 99 being electrically connected, as shown at 100, the strip 98 being connected electrically to the contact point 93, as indicated at 101. The strips 98 and 99 are adapted to be engaged, successively, by a brush 102, connected by a conductor 103 with one side of the whie lamp or flood light 62. The opposite side of the flood light 62 is connected to the conductor 85.

Figure 5:
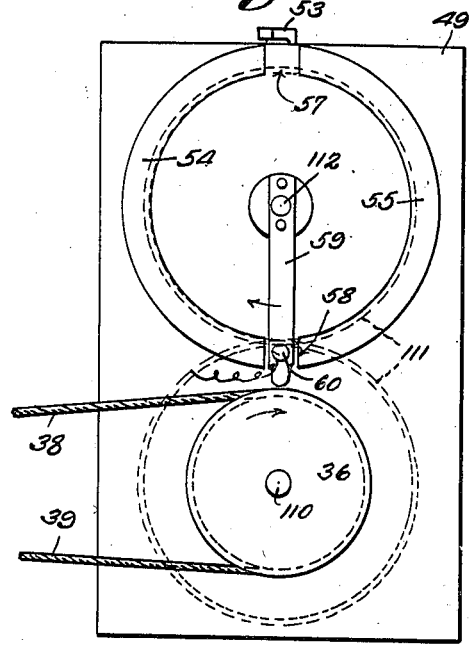
Fig. 5 is a rear elevation showing parts associated with a reversible motor which constitutes means for opening and closing the doors.
Figure 6:
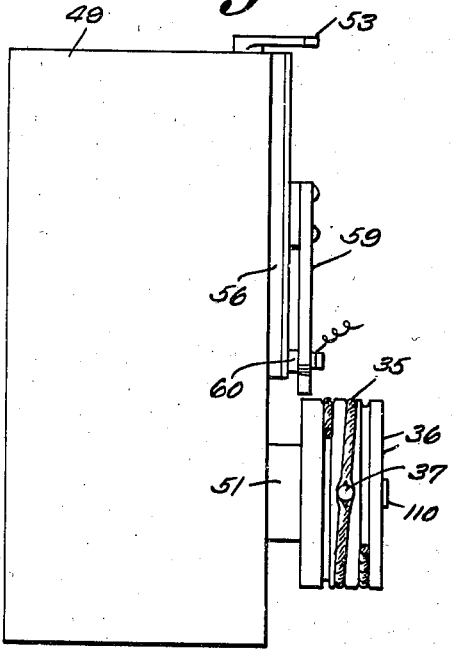
Fig. 6 is an elevation wherein the structure of Fig. 5 is viewed at right angles to that figure.
Figure 8:
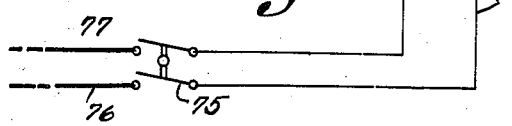
Fig. 8 is a diagrammatic view illustrating the order in which the various steps in connection with the operation of the doors and the handling of the lamp occur.

Referring to Figs. 7 and 8, suppose that the contact 60 on the finger 59 is on the dead point 58, as in Fig. 5, and that the brush 102 is in contact with the strip 98. Then the whie flood lamp 62 is lighted, because it is in a circuit comprising the main 76, the conductor 72, the conductor 71, the brush 70, the ring 69, the conductors 82, the strip 81, the conductor 87, the strip 86, the connection 95, the conductor 94, the contact 93, the connection 101, the strip 98, the brush 102, the conductor 103, the lamp 62, the conductor 85, the conductor 78, and the main 77.

Before the strip 98 leaves the brush 102, and whilst the brush 102 is still in engagement with the strip 98, the rotating drum 65 brings the contact 93 into engagement with the brush 96, and then there is established a circuit including the main 76, the conductor 72, the conductor 71, the brush 70, the ring 69, the connection 82, the strip 81, the conductor 87, the strip 86, the connection 95, the contact point 92, the conductor 94, the contact point 93, the brush 96, the conductor 97, the reversing switch 52, the motor 50, the reversing switch 52, the conductor 78, and the main 77.

When the circuit last above traced out is closed, the contact member 60 of Fig. 5 is caused to ride off the dead point 58, and moves in the direction of the arrow, along the track member 54 upon the dead point 57, the finger 59 operating the switch 52 by way of the arm 53. Then there is established a circuit comprising the conductor 76, the conductor 72, the branch 73, the track 54, the contact point 60, the conductor 97, the switch 52, the motor 50, the switch 52, the conductor 78, and the main 77.

Figure 4:
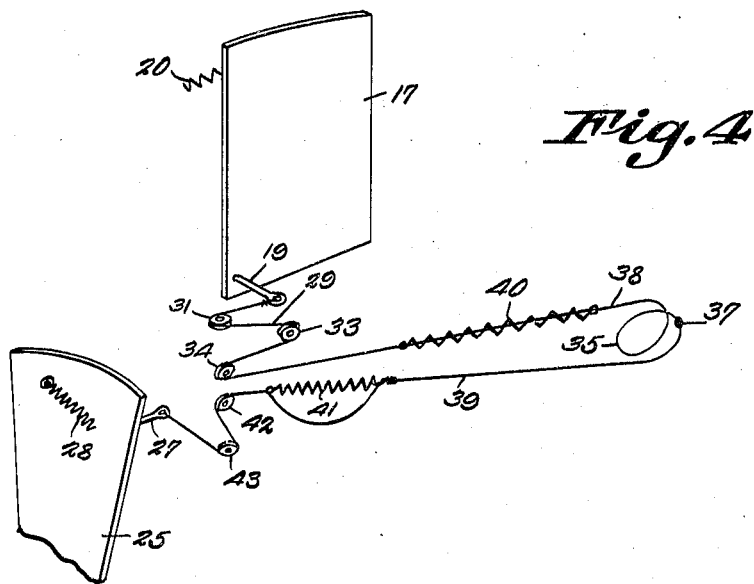
Fig. 4 is a diagrammatic view illustrating the mechanical means whereby the doors are operatively connected to open and to close in timed relation.

Rotation is imparted to the pulley 36, the flexible elements 38, 29, etc., of Fig. 4 are slacked away, the doors 17 are opened, and the display 15 is subjected to white light proceeding from the flood lamp 62.

Whilst the doors 17 are open, the brush 102 leaves the strip 98, and the white flood light 62 is extinguished. The brush 88 comes into contact with the strip 86, and the purple lamp 63 is lighted through a circuit comprising the main 76, the conductor 72, the conductor 71, the brush 70, the ring 69, the connection 82, the strip 81, the connection 87, the strip 86, the brush 88, the conductor 89, the lamp 63, the conductor 85, the conductor 78, and the main 77. Whilst the purple lamp 63 is flooding the brush 96 reaches the contact point 92 on the drum 65.

The circuit established is shown at 76—72—71—70—69—82—81—87—86—95—92—96—97—52—50—52—78—77. The flexible elements 38—29 are slacked away, and the doors 17 are closed by the springs 20.

It will be noted in Fig. 7 that, circumferentially of the drum 65, there is a space between the strip 86 and the strip 99. At this point, all of the brushes 83, 88, 96 and 102 are in contact with the drum 65 only, and a blackout occurs.

The contact 60 is on the dead point 58. The brush 102 comes into contact with the strip 99 on the drum 65, and the white flood lamp 62 is put into operation. During the time that the lamp 62 is in operation, the brush 96 makes contact with the point 91. The circuit established is shown at 76—72—71—70—69—82—81—87—86—95—92—94—91. The finger 59 moves counterclockwise, the contact 60 traversing the track 55. The circuit is the same as that traced out in connection with the track 54, saving that the branch 74 forms part of it. The flexible elements 39, etc., are drawn upon by the pulley 36, and the door 25 opens, exposing the display 24.

During the time that the door 25 is open, the blue flood lamp is lighted through the following circuit: 76—72—71—70—69—82—81—83—84—64—85—78—77.

The contact 60 is on the dead point 57. The arm 53, which has been moved to the right from the position of Fig. 5, is restored to the position there shown, the switch 52 having been thrown. Now the following circuit is established: 76—72—71—70—69—82—81—87—86—95—94—90—96—97—52—50—52—78—77, and the finger 59 moves clockwise in Fig. 5, the contact returning to the dead point 58. During this operation the pulley 36 slacks off the flexible elements 39, etc., and the door 25 closes, under the pull of the spring 28. The circuit for the blue lamp circuit 64 is opened when the brush 83 leaves the strip 81.

Next comes a blackout since the strip 81 is spaced circumferentially of the drum 65 from the corresponding part of the strip 98, the brushes 83, 88, 96 and 102 being out of contact with any of the conducting strips on the drum. The strip 98 comes into contact again with the brush 102, the circuit for the white light 62 is closed, and the cycle is repeated.

The device affords a display panel of novel construction, embodying means for exposing the displays, whatever be their nature, it being possible to illuminate the displays in various colors, and to blackout the entire device at intervals.

During either of the blackouts, any luminous elements on the panel, such as the strips 9 of the symbol, are faintly but appreciably visible.

Having thus described the invention, what is claimed is:

1. In a display device, a panel, first and second displays carried by the panel, first and second doors movably carried by the panel, means for closing the doors automatically, to cause them to hide the respective displays, mechanism for opening the doors one after the other, and for releasing them for closing movement one after the other, a motor operatively connected to said mechanism and reversible to cause the doors to open and close, and means for reversing the motor.

2. In a display device, a panel, first and second displays carried by the panel, first and second doors movably carried by the panel, means for closing the doors automatically, to cause them to hide the respective displays, mechanism for opening the doors one after the other, and for releasing them for closing movement one after the other, a motor operatively connected to said mechanism and reversible to cause the doors to open and close, means for reversing the motor, a flood lamp mounted to play on the panel and to illuminate the displays when the doors are open, and means operated by said mechanism for lighting and extinguishing the lamps in timed relation to the opening and closing of the doors.

3. In a display device, a panel, first and second displays carried by the panel, first and second doors movably mounted on the panel, means for closing the doors automatically, to cause them to hide the respective displays, mechanism for opening the doors one after the other, and for releasing them for closing movement one after the other, a motor operatively connected to said mechanism and reversible to cause the doors to open and close, means for reversing the motor, flood lamps of different colors and mounted to play on the panel and to illuminate the displays when the doors are open, and means operated by said mechanism for lighting and extinguishing the lamps, in timed relation to each other, and in timed relation to the opening and closing of the doors.

4. In a display device, a panel, first and second displays carried by the panel, doors movably mounted on the panel, yieldable means for closing the doors to cause them to hide the displays, and mechanism for opening the doors one after the other, and for releasing them for closing movement one after the other, said mechanism comprising a reversible motor, means for reversing the motor automatically, a pulley driven by the motor, a flexible element wound about the pulley and connected at its ends to the respective doors, and means for guiding the intermediate portion of the flexible element.

5. In a display device, a panel, a V-shaped symbol on the panel, displays on the panel and extended into the space within the symbol, doors movably mounted on the panel, means for closing the doors automatically, to cause them to hide the displays, mechanism for opening the doors one after the other, and for releasing them for closing movement one after the other, a flood lamp mounted to play on the panel, the doors and the symbol, and means under the control of said mechanism for lighting and extinguishing the lamp, in timed relation to the opening and closing of the doors.

6. In a display device, a panel, displays carried by the panel, a pair of doors supported for swinging movement on the panel, yieldable means for closing the doors of the pair, to hide the corresponding display, a single door supported for swinging movement on the panel, yieldable means for closing the other door to hide the other display, a reversing motor carried by the panel, means for automatically reversing the motor, a pulley driven by the motor, a flexible element engaged about the pulley, forwardly projecting arms carried by the doors, one end of the flexible element being attached to the arm of the single door, the flexible element being provided at its opposite end with branches connected to the arms of the doors of the pair, and means for guiding the flexible element between the pulley and the doors.

VALERE LAURENCE MINET.